United States Patent [19]

Esashi et al.

[11] 3,747,745

[45] July 24, 1973

[54] TAPE CARTRIDGE CASE

[75] Inventors: Hanjiro Esashi, Sendai-shi, Miyagi-ken; Tomio Matsumoto, Miyagi-gun, Miyagi-ken, both of Japan

[73] Assignee: Sony Corporation, Tokyo, Japan

[22] Filed: Feb. 11, 1971

[21] Appl. No.: 114,533

[30] Foreign Application Priority Data

Feb. 12, 1970 Japan .............................. 45/12170

[52] U.S. Cl.......... 206/52 R, 206/DIG. 36, 220/31 S

[51] Int. Cl............................................. B65d 85/67

[58] Field of Search ......... 206/52 F, 52 R, DIG. 36, 206/62 P, 62 R, 1 R; 220/31 S; 229/20

[56] References Cited

UNITED STATES PATENTS

| | | | |
|---|---|---|---|
| 3,638,788 | 2/1972 | Solomon | 206/52 R |
| 3,107,783 | 10/1963 | Corey et al. | 220/31 S |
| 2,785,797 | 3/1957 | Rice | 220/31 S |
| 3,130,893 | 4/1964 | Bidopia | 229/20 |
| 3,272,325 | 9/1966 | Schoanmakers | 206/52 R |
| 2,935,190 | 5/1960 | Braun | 206/52 F |

*Primary Examiner*—William T. Dixon, Jr.

*Attorney*—Lewis H. Eslinger, Alvin Sinderbrand and Curtis, Morris and Safford

[57] ABSTRACT

A tape cassette housing having two covers pivotally joined together by a side. Both covers have recesses to receive the raised portions on the sides of a cassette so that the overall dimensions of the case need be only slightly greater than the maximum dimensions of the cassette. Locking means on the inside surface of the covers extend through one of the reel holes in the cassette to hold the two covers together and prevent the cassette from falling out.

10 Claims, 13 Drawing Figures

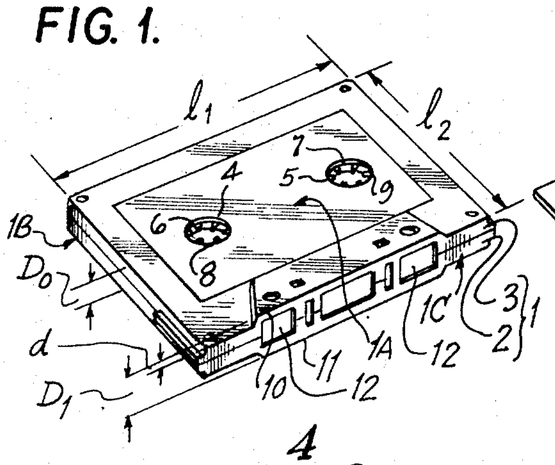
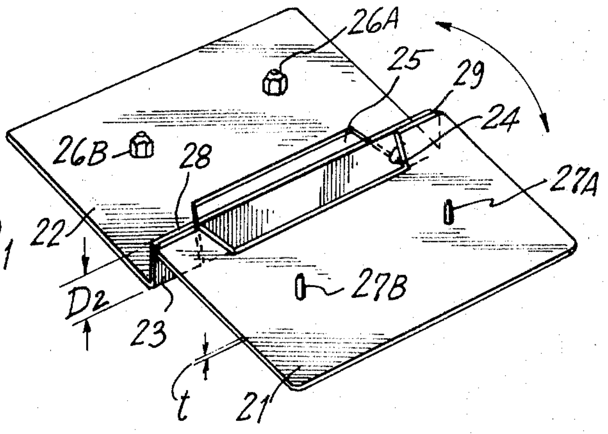
FIG. 2.
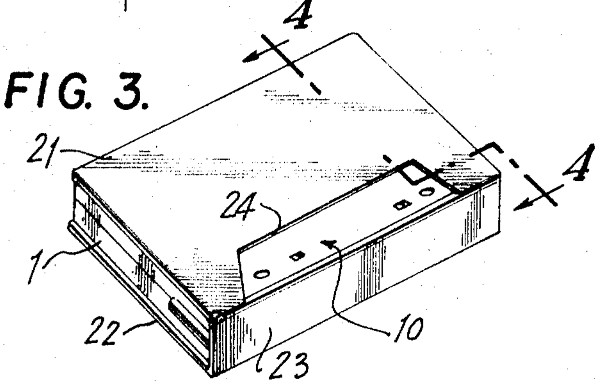
FIG. 4.
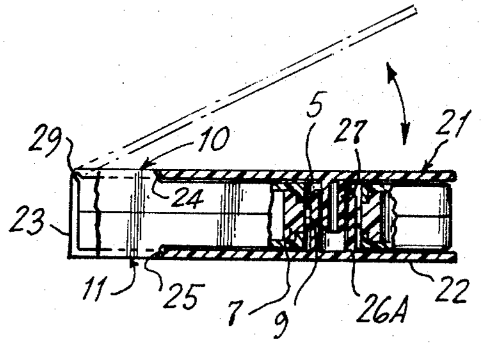
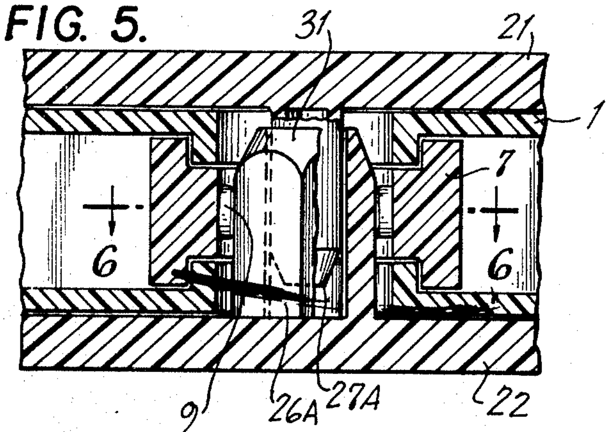
FIG. 7.
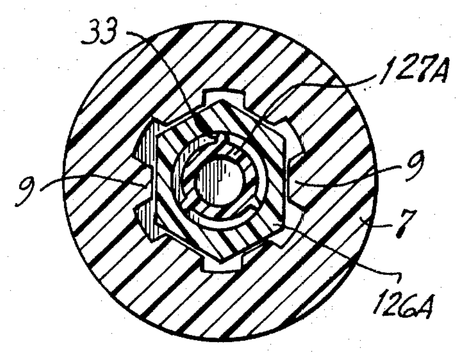
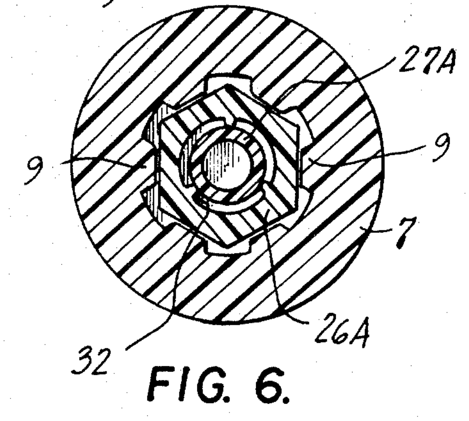
INVENTORS
HANJIRO ESASHI
TOMIO MATSUMOTO
BY
ATTORNEY Patented July 24, 1973 3,747,745

2 Sheets-Sheet 2

INVENTORS
HANJIRO ESASHI
TOMIO MATSUMOTO

BY Lewis H. Eslinger

ATTORNEY

TAPE CARTRIDGE CASE

BACKGROUND OF THE INVENTION

1. Field of the Invention

This invention relates to cases, or housings, for tape cassettes and in particular to a case of minimum size with recesses for raised sections of the cassette and integral locking means to hold the parts of the case together and to engage the cassette.

2. Description of the Prior Art

Tape cassettes, as the term is commonly understood, are in the form of relatively shallow boxes closed on all sides except for two openings in the top and bottom surfaces through which access is gained to internal reels on which the tape is wound and a series of openings in one of the sides through which recording and playback heads can be pressed against the tape. The top and bottom surfaces are substantially rectangular and flat, and both of these surfaces have a raised portion adjacent the side that has the opening for the recording and playback heads.

When a tape cassette is not in use, it is desirable to enclose it within a slightly larger case to cover the openings along the side and to engage the reels to prevent their being turned inadvertently and thereby unwinding the tape. Such cases in the past have been in the form of parallelepipeds having an internal thickness large enough to accommodate the greatest thickness of a cassette, that is, the thickness measured at the two raised surface portions. In addition, the other internal dimensions of cassette cases are normally slightly larger than the overall dimensions of the cassette itself. While such cases appear to be reasonably compact, it is apparent that they occupy an unnecessary amount of space when there is a large number of them stored in one place.

Accordingly, it is an object of the present invention to provide a cassette case that sufficiently covers the cassette to protect it but occupies as little additional space as possible.

In examining a cassette, it will be noted that there are only certain parts that need to be protected. One of these is the side that has the openings permitting direct access to the tape. Other parts that need to be protected are the holes aligned with the tape reels. In addition, the labels commonly applied to the top and bottom surfaces should also be protected against abrasion and against being marked up.

It is a further object of the invention to cover only those parts of the cassette that must be covered so that the case can be of minimum size.

A still further object of the invention is to provide interlocking means that extend through the reel openings to keep the two sides of the case locked together around the cassette and to hold the cassette in place within the case.

SUMMARY OF THE INVENTION

The invention comprises two flat plate members slightly larger in size than the top and bottom surfaces of a cassette. Each of the plate members has a trapezoidally-shaped recess or opening to receive the correspondingly shaped raised portions of the cassette. The top and bottom members are pivotally joined together by a side member that covers the side of the cassette in which the openings are located for the tape recording and playback heads. On the inner surface of one of the plate members is a projection positioned to extend through one of the reel openings in the cassette and to engage a locking portion of the other plate member.

For the sake of convenience, additional trapezoidal openings may be placed in other edges of the plate members and the plate members may be slightly enlarged to permit the cassette to be inserted into the case in different positions. Also, the pivotal connection between the top and bottom members may be located between the top member and the side member or at an intermediate location along the side member. The projection that extends into the reel opening will have a non-circular external configuration to fit driving spline studs in the reel to prevent the latter from turning after it has been placed in the case.

BRIEF DESCRIPTION OF THE DRAWINGS

FIG. 1 is a perspective view of a cassette;

FIG. 2 is a perspective view in the open position of one embodiment of a case constructed according to the invention;

FIG. 3 shows the case of FIG. 2 closed;

FIG. 4 is a cross-sectional view of the case in FIG. 3 along the lines 4—4;

FIG. 5 is an enlarged cross-sectional view of a fragment of the case in FIG. 4;

FIG. 6 is a cross-sectional view of the reel and interlocking members of FIG. 5 along the line 6—6;

FIG. 7 is a cross-sectional view corresponding to FIG. 6 but showing a modified interlocking arrangement;

DETAILED DESCRIPTION OF THE INVENTION

Figures 8, 9:
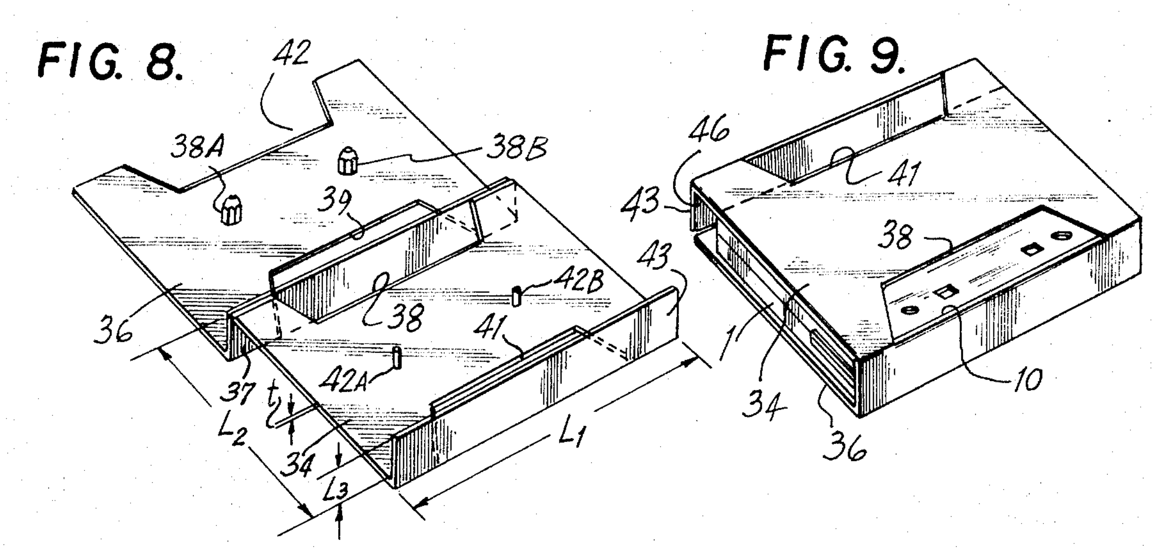
FIG. 8 is a modified embodiment of a case constructed according to the invention.
FIG. 9 shows the case in FIG. 8 in its closed configuration.

FIG. 1 shows a typical cassette 1 to be housed in the cassette case of the present invention. The cassette has a bottom half 2 and a top half 3 which is a mirror image of the bottom half. The cassette has two large rectangular surfaces, of which only the top surface 1A is shown in the drawing, and a shallow side and back surfaces, of which only the side 1B is shown. It also has a front surface 1C in which are several openings for access to the tape within the cassette. In the top surface 1A are two circular openings 4 and 5 beneath which are two tape reels 6 and 7 that carry the recording tape in the cassette. These reels have short, inwardly extending studs 8 and 9 that serve as splines to engage drive shafts on a cassette recorder or playback machine.

Along the front 1C of the cassette, a trapezoidal portion 10 of the upper surface 1A is raised above the level of the remainder of the upper surface. In keeping with the mirror image symmetry of the cassette, there is a similar raised portion 11 on the opposite surface. These two raised portions provide room for a series of windows 12 through which recording and playback heads may be inserted far enough into the cassette to press against the magnetic recording tape.

The dimensions of the cassette that are relevant include its overall length $l_1$ and its depth $l_2$ along with certain thicknesses. Most of the cassette has the thickness $D_O$, but the total thickness of the cassette at the raised portions 10 and 11 is increased by $2d$ where $d$ is the height of each of the raised portions 10 and 11 above the rest of the upper and lower surfaces, respectively. The total thickness of the cassette measured between the outer surfaces of the raised portions 10 and 11 is $D_1$.

The case in FIG. 2 is shaped to fit snugly around the cassette 1 in FIG. 1 and includes two plate members 21 and 22. The plate member 21 is designated as the top member and the plate member 22 as the bottom member for the sake of clarity of description, although these members are essentially interchangeable. They are made of a suitable tough resilient plastic such as polyethylene or polypropylene which is injection molded as a unitary structure. The members 21 and 22 are joined together by a side member 23 which is rigidly attached to the member 22 but is attached to the member 21 by very thin sections 28 and 29 that form hinge means between the member 21 and the side 23.

The top member 21 has a recess in the form of an open window 24 formed in it and shaped to fit relatively snugly around the trapeziodally raised portion 10 of the cassette in FIG. 1. Similarly, the bottom member 22 has a recess in the form of a trapezoidal window 25 to fit around the raised portion 11. The bottom member also has two projections 26A and 26B extending upwardly therefrom and located so that they fit within the reels 7 and 6, respectively, of the cassette when the cassette is placed on the bottom member 22 and with the raised portion 11 fitting into the window 25. The top member 21 has two matching projections 27A and 27B to engage the projections 26A and 26B to hold the two members 21 and 22 together after a cassette has been placed between them, thereby holding the cassette securely in place. These projections are placed farther from the side 23 than from the outer edges of the members 21 and 22 because that is the way cassettes are made. The width of the strip 23 is indicated by the designation $D_2$, which is substantially equal to the thickness $D_1$ of the cassette in FIG. 1. Both the top member 21 and the bottom member 22 have a thickness $t$ which is substantially equal to the height d of the raised portions 10 and 11 of the cassette.

FIG. 3 shows the case of FIG. 2 closed about a cassette 1. As may be seen, the trapezoidal raised portion 10 of the cassette extends into the window 24 so that the upper surface of the raised portions is substantially coplanar with the outer surface of the top member 21. Thus, the total thickness of the cassette and case is not substantially greater than the greatest thickness of the cassette alone.

FIG. 4 is a cross-sectional view showing the way the cassette fits into the case and particularly showing the interlocking relationship between the projections 26A and 27A. In this embodiment the projection 26A is a short hollow cylinder, the outer dimensions of which are such that it will just fit between the studs 9 of the reel 7, and the projection 27A is also a short cylinder which happens to be hollow and which has an outer configuration that frictionally engages the inner surface of the cylinder 26A. FIG. 4 also shows the way that the raised portions 10 and 11 fit into the windows 24 and 25 of the top and bottom members 24 and 25, respectively.

The cassette case shown in FIGS. 2–4 has top and bottom members 21 and 22 that are substantially the same size as the upper and lower surfaces of the cassette itself and extend only slightly beyond the perimeter of the upper and lower surfaces. This cassette case is of the minimum dimensions and forms that most compact packaging possible with a standard cassette.

FIG. 5 is an enlarged cross-sectional view that shows the interlocking relationship of the projections 26A and 27A more explicitly. As may be seen in FIG. 5, the outer surface of the projection 26A has the shape of a hexagonal cylinder, which conforms with the arrangement of the studs 9 in a standard cassette. As a result, the studs 9 fit closely against the flat surfaces of this hexagonal cylinder and is impossible for the reel 7 to rotate when the cassette is in place. In this way the tape is prevented from unreeling inadvertently. The upper end of the projection 26A is tapered so as to facilitate fitting the reel 7 thereon, and the free end of the projection 27A is also tapered, partly to facilitate putting the reel thereon in case the reel is placed on the top member 21 instead of on the bottom member 22, but also to facilitate entry of the projection 27A into the inner cylindrical space in the projection 26A. The total length of the projections 26A and 27A when telescoped together, as shown, is less than, or, at least, not substantially greater than the total thickness $D_O$ of the cassette (FIG. 1).

FIG. 6 shows only the reel 7 and a cross-sectional view of the projections 26A and 27A. As shown, the inner surface of the outer projection 26A has a plurality of longitudinal ribs 32 extending along it to increase the frictional engagement between the projections 26A and 27A so as to prevent the top member 21 and the bottom member 22 from flying apart inadvertently. FIG. 6 also shows the relation between the studs 9 and the hexagonal outer surface of the projection 26A that prevents the reel from rotating once it is placed on the projection 26A.

FIG. 7 shows a structure quite similar to that in FIG. 6 except that the inner projection identified by reference numeral 127A has longitudinal outer ribs 33 that engage the smooth inner surface of the projection 126A to achieve frictional locking engagement between the projection 126A and 127A.

FIGS. 8 and 9 show a modified cassette case so arranged that the cassette can be placed in it in either of two directions. The cassette case in FIG. 8 has a top plate member 34 and a bottom plate member 36 joined together by a side member 37. The top plate member has a window 38 in it and the bottom plate member has a window 39, and these windows are shaped like the windows 24 and 25 in the case of FIG. 2 to fit the raised portions of the cassette in FIG. 1. The bottom member 36 has two upwardly extending hexagonal projections 38A and 38B to fit into the reels 6 and 7 respectively. To this extent the cassette case in FIG. 8 is similar to that in FIG. 2.

The difference between the cassette cases in FIGS. 2 and 8 is that the cassette case in FIG. 8 has additional windows 41 and 42 shaped like the windows 38 and 39 to receive the raised portions 10 and 11 of the cassette in FIG. 1. As a result, the projections 38A and 38B are placed midway along the bottom plate member 36 and the latching, or engaging, projections 42A and 42B are similarly placed. The configuration of the cassette 1 is such that the holes 4 and 5 are closer to the backside of the cassette than to the front 1C (FIG. 1), which means that the projections 26A and 26B in FIG. 2 must be placed accordingly. However, since the cassette can be placed in the case in FIG. 8 in either direction, it is necessary for these projections to be placed along the central line.

The cassette case in FIG. 8 also has a flap 43 extending perpendicularly from the edge of the top member 34 to cover the side 1C of the cassette in case the cassette is placed in the case with that side facing outwardly. The total length of the cassette case is indicated by the measure $L_1$, which is substantially equal to the overall length $l_1$ of the cassette 1 in FIG. 1, but the length $L_2$ of the case in FIG. 8 is somewhat greater than the depth $l_2$ of the cassette in FIG. 1. The flap 43 has a height $L_3$ that is approximately equal to the maximum thickness $D_1$ of the cassette.

FIG. 9 shows the case of FIG. 8 closed around a cassette. The cassette 1 has been placed in the case in the same orientation as the cassette was placed in the cassette case of FIG. 3, although it could have been placed in the case in the opposite direction. The raised portions 10 and 11, of which only raised portion 10 is shown, extend through the windows 38 and 39, and the top surfaces of the raised portions 10 and 11 are substantially coplanar with the outer surfaces of the top and bottom members 34 and 36 of the case. As may be seen, there is a small empty space 46 between the flap 43 and the back side of the cassette 1. Usually the critical dimension in trying to store cassettes and their cases is the total thickness, and therefore the empty space 46 is not as deleterious as would be an empty space in the thickness direction.

Figure 10:
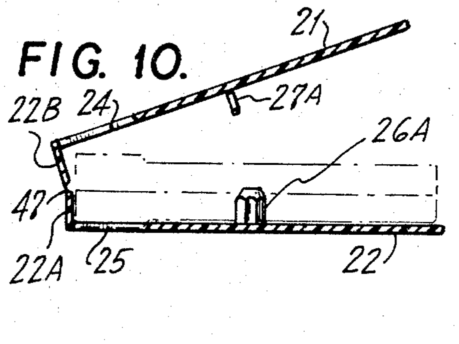
FIG. 10 is a cross-sectional view of another embodiment of the invention with a modified hinge arrangement.

The cassette cases in FIGS. 2 and 8 have relatively limited hinge areas because of the windows in the top and bottom members. FIG. 10 shows a modified cassette case which has the same dimensions as that in FIG. 2 but has a hinge area 47 that extends across the central portion of the side member, which is identified by reference numerals 22A and 22B to indicate that it is similar to the side member 22 in FIG. 2 but is divided centrally by the thin hinge portion 47. The remainder of the cassette case in FIG. 10 is similar to or identical with the cassette case in FIG. 2 and has been given similar reference numerals. The greater length of the hinge 47 makes it stronger and longer lasting than the hinges 28 and 29 in FIG. 2.

Figures 11, 13:
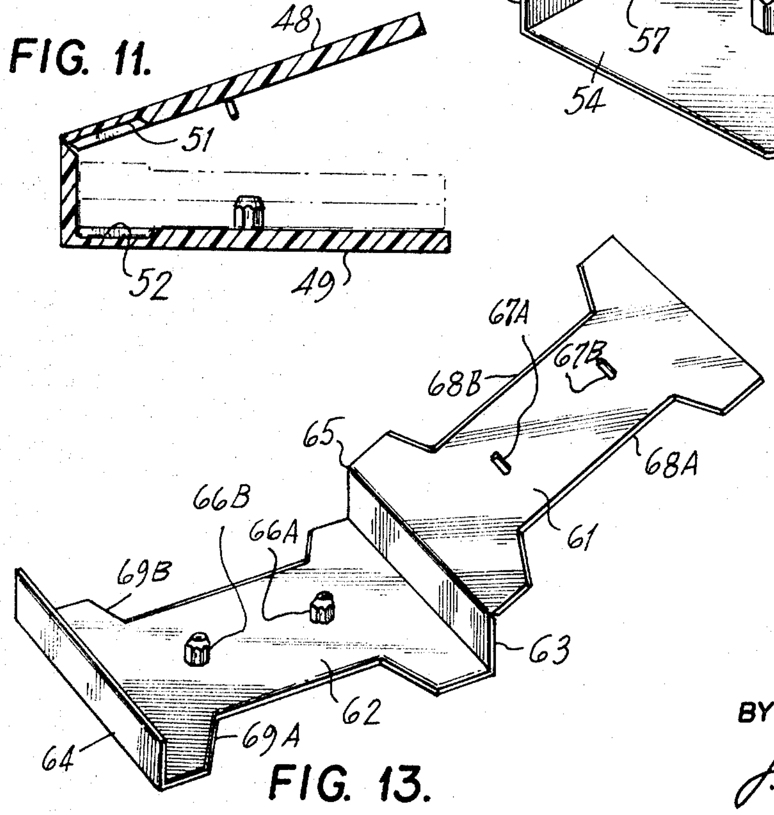
FIG. 11 is a cross-sectional view of a further modification of the invention with closed recesses for raised portions of the cassette.
FIG. 13 is still a further modification of the invention.

If it is desired to protect the top and bottom surfaces of the cassette completely, the recesses into which the raised portions extend may be made in the form of relatively shallow depressions instead of open windows. Such a modified form of cassette case is shown in FIG. 11 in which the top plate member is identified by reference numeral 48 and the bottom plate member by reference numeral 49. The top plate member has a trapezoidal depression 51 in it and the bottom plate member 49 has a trapezoidal depression 52 in it to receive, respectively, the raised portions 10 and 11 of the cassette in FIG. 1. The members 48 and 49 are, therefore, thicker than the members 21 and 22 in the cassette case of FIG. 2 but otherwise the dimensions are similar.

Figure 12:
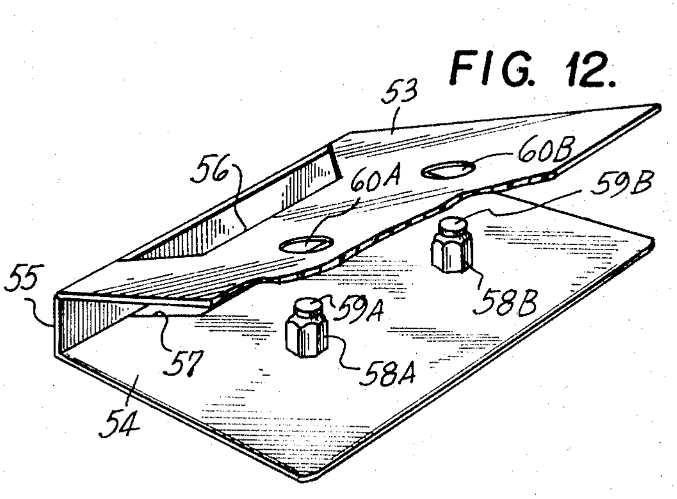
FIG. 12 is a perspective view showing a different locking arrangement for a case according to the invention.

FIG. 12 shows another embodiment of the invention with top and bottom plate members 53 and 54, respectively, joined together by a side member 55. The top plate member has a trapezoidal opening 56 in it and the bottom plate member 54 has a similar opening 57 to fit the raised projections of the cassette.

The bottom member 54 has two opwardly extending hexagonal posts 58A and 58B with detent means 59A and 59B at their upper ends. These detent means fit into and lock with the perimeters of two holes 60A and 60B in the top plate member 53 to hold the two plate members 53 and 54 in parallel position around a cassette.

FIG. 13 shows still another form of the invention arranged, as in the embodiment in FIG. 8, so that the cassette could be put into the case in either of two directions. The cassette case in FIG. 13 includes a top plate member 61 and a bottom plate member 62. The bottom plate member 62 has two perpendicular flaps, or side members 63 and 64 and is joined to the top member 61 by a reduced thickness hinge 65 that extends the full length of the side member 63. The bottom member 62 has two upwardly extending, centrally located projections 66A and 66B to fit into and prevent the rotation of the reels of a cassette. These projections engage a correponding pair of projections 67A and 67B when the top plate member 61, which closes upon the lower plate member 62 and the side members 63 and 64, is snapped shut.

The windows that are cut out to leave room for the raised projections 10 and 11 of the cassette of FIG. 1 are not along the hinge area but are along sides of the case perpendicular to the hinge. In addition, the case in FIG. 13 is symmetrical so that the cassette can be placed in it in either of two orientations. For this reason, the case has two cutout projections 68A and 68B in the top plate member 61 and two matching cutout sections 69A and 69B in the bottom plate member 62.

What is claimed is:

1. A case for housing a tape cassette which has substantially parallel top and bottom surfaces, tape access openings along a front surface, tape reel means therein, and holes in said top and bottom surfaces to permit access to said tape reel means, said case comprising: a bottom plate member; a top plate member; side means joined rigidly to said bottom plate member; hinge means connected with said side means whereby said top and bottom plate members may be pivotally moved apart; and an integral projection having a polygonal outer surface fitting with said tape reel means to prevent rotation thereof and extending from said bottom plate member toward said top plate member through said reel means to lock said plate members into position adjacent said surfaces of said cassette the space between said projection and said side means being substantially equal to the diatance between said holes in said top and bottom surfaces and said front surface.

2. The invention as defined in claim 1 in which said case is of a resilient plastic material and said hinge means is an integral part of said plastic material and extends across the central region of said side means.

3. The case of claim 1 in which said plate members have recesses to receive raised portions of said top and bottom surfaces, the thickness of each of said plate members being greater than the height of said raised portions, and said recesses forming depressions extending into but not through said plate members to receive said raised portions, the depth of said depressions being substantially equal to the height of said raised portions.

4. The invention as defined in claim 1 in which said plate members have recesses along edges thereof perpendicular to said side means to receive raised portions of said top and bottom surfaces.

5. The case of claim 1 in which said other plate member has a hole therein aligned with said projection, and said projection snaps into engagement with the perimeter of said hole.

6. The case of claim 1 comprising, in addition, a second integral projection extending from the inner surfaces of said other plate member and comprising longitudinal outwardly-directed ribs, said first-named projection being a hollow cylinder and said second projection extending into said first-named projection with said ribs frictionally engaging said first-named projection.

7. The case of claim 1 in which said first-named projection is a hollow cylinder and said second projection is cylindrical and extends from the inner surface of said top plate member into said hollow cylinder, and said first-named projection comprises longitudinal, inwardly-directed ribs to engage said second projection.

8. The case of claim 1 in which said top plate member comprises first and second windows along opposite edges to receive a raised portion of the top surface of said cassette; and said bottom plate member has third and fourth windows juxtaposed with respect to said first and second windows to receive a raised portion of the bottom surface of said cassette; and said projection is located on a line substantially midway between said third and fourth windows.

9. The case of claim 8 in which said windows are along edges parallel to said hinge means.

10. The case of claim 8 in which said windows are along edges perpendicular to said hinge means.

* * * * *